(12) United States Patent
Nakanishi et al.

(10) Patent No.: US 11,680,174 B1
(45) Date of Patent: Jun. 20, 2023

(54) COATING COMPOSITION, COATING FILM FORMING METHOD, AND ENGINE COMPONENT

(71) Applicant: MAZDA MOTOR CORPORATION, Hiroshima (JP)

(72) Inventors: Yuki Nakanishi, Hiroshima (JP); Hiroyuki Koga, Hiroshima (JP); Ken Sakamoto, Hiroshima (JP); Masaya Minato, Hiroshima (JP); Tsutomu Shigenaga, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 18/150,563

(22) Filed: Jan. 5, 2023

(30) Foreign Application Priority Data

Feb. 4, 2022 (JP) .............................. JP2022-016655

(51) Int. Cl.
| | |
|---|---|
| *F02B 75/08* | (2006.01) |
| *C09D 5/18* | (2006.01) |
| *C09D 183/04* | (2006.01) |
| *C09D 7/40* | (2018.01) |
| *C09D 7/20* | (2018.01) |
| *F02F 3/02* | (2006.01) |
| *C09D 7/62* | (2018.01) |
| *C08K 7/26* | (2006.01) |
| *C08K 9/04* | (2006.01) |

(52) U.S. Cl.
CPC ................. *C09D 5/18* (2013.01); *C09D 7/20* (2018.01); *C09D 7/62* (2018.01); *C09D 7/67* (2018.01); *C09D 7/68* (2018.01); *C09D 7/70* (2018.01); *C09D 183/04* (2013.01); *F02F 3/02* (2013.01); *C08K 7/26* (2013.01); *C08K 9/04* (2013.01); *C08K 2201/005* (2013.01); *C08K 2201/011* (2013.01)

(58) Field of Classification Search
CPC ........ B05D 1/02; C09D 163/00; C23C 28/04; F05D 2230/90
USPC ........................................................ 123/668
See application file for complete search history.

(56) References Cited

U.S. PATENT DOCUMENTS

| | | | |
|---|---|---|---|
| 2011/0165331 A1* | 7/2011 | Barth ....................... | B05D 5/08 508/172 |
| 2017/0088792 A1* | 3/2017 | Kobayakawa ........... | C08K 3/36 |
| 2017/0313893 A1* | 11/2017 | Yasuda ................ | C10M 125/02 |
| 2018/0038309 A1* | 2/2018 | Sasaki ........................ | F16J 1/01 |

(Continued)

FOREIGN PATENT DOCUMENTS

| | | |
|---|---|---|
| JP | 2015-129220 A | 7/2015 |
| JP | 6287726 B2 | 3/2018 |
| WO | 2018/212064 A1 | 11/2018 |

*Primary Examiner* — Long T Tran
*Assistant Examiner* — James J Kim
(74) *Attorney, Agent, or Firm* — Studebaker & Brackett PC

(57) ABSTRACT

A coating composition for forming a coating film including particles and a resin binder is so configured that a content of the particles in the coating film is more than 30 vol%, the coating composition includes the particles, a raw resin of the resin binder, and a solvent, and a ratio V/D is 2.5 or less, where V is a volatilization rate (g/m²·s) of the solvent, and D is a diffusion coefficient ($10^{-9}$ m²/s) of the solvent in the coating composition.

20 Claims, 6 Drawing Sheets

(56) References Cited

U.S. PATENT DOCUMENTS

2020/0095385 A1  3/2020  Yoshihara
2020/0124099 A1* 4/2020  Sakai .................. C10M 113/08

* cited by examiner

COATING COMPOSITION, COATING FILM FORMING METHOD, AND ENGINE COMPONENT

CROSS-REFERENCE TO RELATED APPLICATION

This application claims priority to Japanese Patent Application No. 2022-016655 filed on Feb. 4, 2022, the entire disclosure of which is incorporated by reference herein.

BACKGROUND

The present disclosure relates to a coating composition, a coating film forming method using the coating composition, and an engine component with the coating film.

It has been in practice that coating is used to form a coating film on a surface of a coating target such as industrial products, building materials, and automotive components. Such coating would include various particle components for adding various functions to the coating, such as aesthetic appearance, anti-lusting property, heat resistance property, or heat blocking property.

For example, International Patent Publication No. WO 2018/212064 discloses a low-viscosity solvent composition in which core shell polymer particles are dispersed stably in an organic solvent at a high density, and a producing method thereof. In this document, the solvent composition includes an organic solvent including, at a weight ratio ranging from 15:85 to 95:5, an organic solvent (A) and an organic solvent (B), which satisfy their predetermined requirements, respectively, and one or more types of core shell polymer particles, wherein core shell polymer particle content is in a range of 20 wt% to 40 wt% with respect to a total weight of the solvent composition.

Moreover, Japanese Unexamined Patent Publication No. 2015-129220 discloses an anti-rusting coating composition precursor, including polyaniline, polyvinyl butyral, and an alcohol-based solvent, wherein storage elastic modulus and loss elastic modulus, measured under predetermined conditions are within predetermined ranges. This document describes that the use of such a precursor makes it possible to obtain an anti-rusting coating composition that can inhibit the agglomeration of polyaniline.

Japanese Patent No. 6287726 discloses a heat blocking layer including a large number of hollow particles and a binder for filling spaces between the hollow particles and holding the hollow particles in a coating target, wherein the binder is a silicone resin including a T unit and a d unit as basic structural units. The heat blocking layer is a heat blocking layer with excellent thermal properties, improved in heat resistance, thermal conductivity, and volumetric heat capacity. The heat blocking layer is obtained by applying, on a surface of a substrate, a heat blocking material prepared by mixing the binder and the hollow particles together by stirring, and baking a layer thus formed.

SUMMARY

Coating materials with a high particle content have such a drawback that, even if a coating film formed from such a coating material has a surface smoothness right after film formation, the surface smoothness would be deteriorated after drying and baking.

In view of this, the present disclosure provides a coating composition, a coating film forming method using the coating composition, and engine components provided with coating film, which can ensure sufficient surface smoothness in the coating film after drying and baking, even if the coating film has a high particle content.

In order to address the problem, a coating composition according to one aspect disclosed herein is a coating composition for forming a coating film including particles and a resin binder, wherein a content of the particles in the coating film is more than 30 vol%, the coating composition includes the particles, a raw resin of the resin binder, and a solvent, and a ratio V/D is 2.5 or less, where V is a volatilization rate ($g/m^2 \cdot s$) of the solvent, and D is a diffusion coefficient ($10^{-9}$ $m^2/s$) of the solvent in the coating composition.

During applying the coating composition on a coating target, and drying and baking the coating composition, the solvent gradually volatilizes from the surface of the film of the coating composition. Along the volatilization of the solvent, the film of the coating composition shrinks, thereby eventually forming a coating film including the particles and the resin binder.

For example, in the case of the formation of a coating film with a low particle content, the diffusion rate of the solvent in the inner portion of the film of the coating composition matches with the volatilization rate of the solvent volatilizing from the surficial portion of the film of the coating composition. As a result of this, the flowability of the particles is ensured, so that the difference in the ratio of the solvent to the solid content (the ratio may be referred to as "solvent concentration" in this specification) between the surficial and inner portions of the film of the coating composition is kept insignificant, thereby allowing the shrinkage of the film of the coating composition to take place relatively uniform as a whole along the volatilization of the solvent. Therefore, in the case of the formation of a coating film with a low particle content, ensuring a sufficient surface smoothness in the coating film right after the film formation thereof is sufficient for ensuring a sufficient surface smoothness in the coating film.

However, in the case of the formation of a coating film with a high particle content, the presence of a large number of the particles reduces the diffusion rate of the solvent within the inner portion of the film of the coating composition. This makes it difficult for the diffusion rate of the solvent to keep matching with the volatilization rate of the solvent, which reduces the flowability of the particles. This increases the difference in solvent concentration between the surficial and inner portions of the film of the coating composition. Accordingly, the flowability of the particles further decreases in the surficial portion of the coating composition as the viscosity increases along with the decrease in solvent content, and consequently, the particles would protrude from the surface of the coating film or cause undulation on the surface of the coating film, reflecting the geometry of the particles. As a result, the surficial smoothness of the coating film after drying and baking becomes lower than right after the film formation.

This configuration is so configured that, in a system with a high particle content in the coating film, the ratio V/D of the volatilization rate V to the diffusion coefficient D is not beyond the predetermined value described above. This configuration can ensure a sufficient flowability of the particles during the drying and baking even in such a system with a high particle content. As a result of this, the difference in solvent concentration between the surficial and inner portions of the film of the coating composition is kept insignificant, so that the shrinkage of the film of the coating composition proceeds more uniformly along the volatilization of the solvent. This can ensure sufficient surface smoothness in the coating film after the drying and baking thereof.

It is preferable that the ratio V/D be 1.6 or less.

This allows to effectively ensure a sufficient surface smoothness in the coating film after the drying and baking thereof.

The solvent may include a hydrocarbon solvent and/or an alcohol-based solvent.

The compatibility between the raw resin of the resin binder and the particles can be improved by the solvent containing both the hydrophobic and hydrophilic components.

It is preferable that the hydrocarbon solvent be an aromatic solvent, which may preferably include at least one selected from the group consisting of toluene, xylene, and 1,2,4-trimethylbenzene. It is preferable that the alcohol-based solvent includes at least one selected from the group consisting of 2-ethylhexanol, 1-butanol, and 1-propanol.

The particles may include at least either hollow particles or nanoparticles. Moreover, the resin binder may be a silicone-based resin binder. The particles and resin binder configured as above can provide excellent heat blocking property to the coating film. Therefore, such coating compositions are suitable as coating materials for producing a heat blocking layer.

In one aspect, the coating composition may be a coating material for coating a combustion chamber-facing portion of a component of an engine, the component constituting a combustion chamber of an engine.

This configuration can ensure a sufficient surface smoothness of the coating film, thereby hindering prolongation of the traveling time of the fuel or slow combustion of the fuel, so as to improve the fuel consumption.

A method of forming a coating film according to one aspect disclosed herein is a method of forming a coating film on a surface of a coating target with the coating composition described above, the method including applying the coating composition on the surface of the coating target; and baking the coating composition thus applied, so as to obtain the coating film, wherein the applying includes applying the coating composition in such a way that the coating film will be 25 µm or more but not more than 100 µm in thickness after the baking.

This configuration can ensure a sufficient flowability of the particles during the drying and baking even in such coating film formation with a high particle content. As a result of this, the difference in solvent concentration between the surficial and inner portions of the film of the coating composition is kept insignificant, so that the shrinkage of the film of the coating composition proceeds more uniformly along the volatilization of the solvent. This can ensure sufficient surface smoothness in the coating film after the drying and baking thereof.

It is preferable that the coating target be an engine component having a portion constituting a combustion chamber, and the surface be a surface of the portion.

This configuration can ensure a sufficient surface smoothness of the coating film, thereby hindering prolongation of the traveling time of the fuel or slow combustion of the fuel, so as to improve the fuel consumption.

An engine component according to one aspect disclosed herein is an engine component, including: a portion constituting a combustion chamber; and a coating film provided on a surface of the portion and formed from the coating composition described above.

The engine component according to this configuration can ensure a sufficient surface smoothness of the coating film, thereby hindering prolongation of the traveling time of the fuel or slow combustion of the fuel, so as to improve the fuel consumption.

It is preferable that the coating film be a heat blocking layer.

This configuration can ensure a sufficient heat blocking property of the portion of the engine component, the portion constituting the combustion chamber, and thereby can facilitate the improvement of the fuel consumption.

It is preferable that the coating film includes large numbers of hollow particles and nanoparticles, and a resin binder. It is preferable that the resin binder be a silicone-based resin binder. The particles and resin binder configured as above can provide excellent heat blocking property to the coating film.

It is preferable that the coating film be 25 µm or more but not more than 100 µm in thickness.

This configuration can ensure a sufficient heat blocking property of the heat blocking layer.

The engine component may be preferably at least one of a piston, a cylinder head, or a cylinder block.

As described above, the present disclosure can ensure, during drying and backing, sufficient flowability of the particles in the coating composition for forming a coating film with a high particle content. As a result of this, the difference in solvent concentration between the surficial and inner portions of the film of the coating composition is kept insignificant, so that the shrinkage of the film of the coating composition proceeds more uniformly along the volatilization of the solvent. This can ensure sufficient surface smoothness in the coating film after the drying and baking thereof.

DETAILED DESCRIPTION

Figure 1:
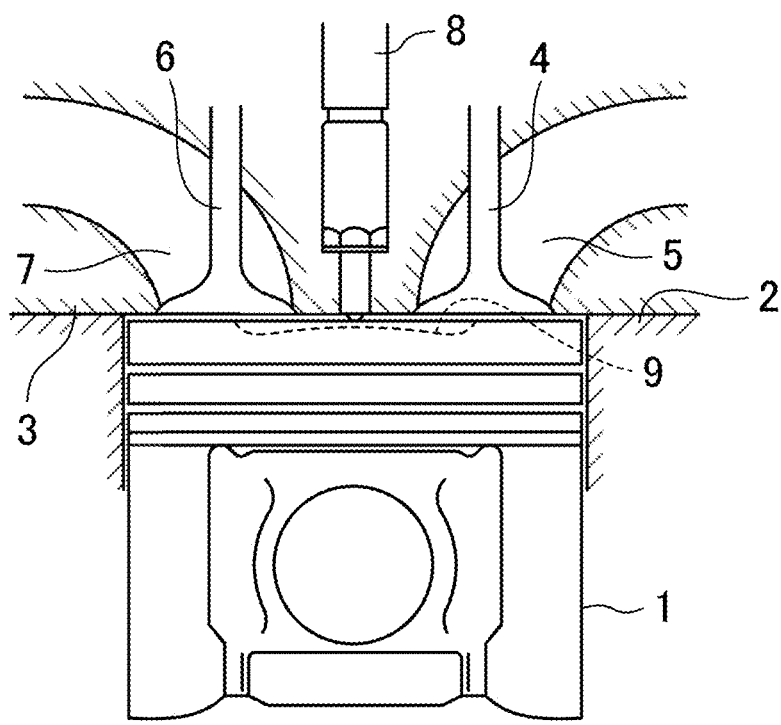
FIG. 1 is a cross-sectional view of an engine, which in an exemplary application of the present disclosure.

Embodiments of the present disclosure will now be described in detail with reference to the drawings. The following embodiments are merely exemplary ones in nature, and are not intended to limit the scope, applications, or use of the disclosure.

<Coating Film>

A coating film according to the present embodiment is not limited to any particular type of coating film, and is a coating film formed on a surface of a coating target such as industrial products, building materials, and motor vehicle components.

The coating film includes therein particles in order to add various functions to the coating film, such as aesthetic appearance, anti-lusting property, heat resistance property, and heat blocking property. Moreover, the coating film includes a resin binder for holding particles on the surface of the coating target, on which the coating film is formed, and filling spaces between the particles to form a matrix of the coating film.

[Particles]

The particles are not particularly limited and are a particle component containable in general coating films. Specific examples of such particles include pigments, fillers, reinforcing fibers, metal flakes, and functional particles.

A pigment is added in a coating film for coloring or the like of the coating film. The pigment is not particularly limited, and may be a generally used pigment such as red pigments, black pigments, yellow pigments, blue pigments, green pigments, and purple pigments.

A filler is added in a coating film for providing a strength or the like to the coating film. The filler is not particularly limited, and may be a generally used filler such as talc, kaolin, or mica.

The reinforcing fibers are added in a coating film for providing a strength or the like to the coating film. The reinforcing fibers are not particularly limited, and may be generally used reinforcing fiber such as glass fiber, carbon fiber, metal fiber, natural fiber, and synthetic fiber.

The metal flakes are added in a coating film for adding an aesthetic appearance such as metallic luster to the coating film. The metal flakes are not particularly limited, and may be generally used metal flakes such as aluminum flakes, copper flakes, or stainless-steel flakes.

The functional particles are added in a coating film for adding various functions such as anti-lusting property, heat resistance property, or heat blocking property to the coating film. The functional particles are not particularly limited, and may be generally used functional particles such as hollow particles, nanoparticles, or core shell polymer particles.

If the coating film is a heat blocking layer as described below, it is preferable that, for example, the particles be functional particles, such as hollow particles or nanoparticles, and it is more preferable that the particles be at least one of hollow particles or nanoparticles, from the viewpoint of improving heat blocking property.

The particles may include a single type of particles, or a combination of plural types of particles.

The particles are not particularly limited in terms of their average particle diameter (in this specification, the "average particle diameter" is the "number-average particle diameter") and the average particle diameter of particles may be a generally adopted known one and may be selected as appropriate according to usage of the coating film. The average particle diameter of the particles may be determined by determining D50, which is a value of the particle diameter at 50% in particle diameter distribution measured by, for example, a laser diffraction type particle size distribution measurement device.

A content of the particles in the coating film is more than 30 vol%. In the case where the coating film includes two or more types of particles, the content of the particles is a total content of all the types of particles contained therein. The content of the particles may be, but not limited to, for example, 40 vol% or more but not more than 80 vol%, preferably 45 vol% or more but not more than 75 vol%, or more preferably 50 vol% or more but not more than 70 vol%.

[Resin Binder]

The resin binder is not particularly limited and may be any resin binder employable in general coating films. The resin binder may be, for example, but not limited to, a silicone-based resin binder, an epoxy-based resin binder, an acrylic-based resin binder, a polyester-based resin binder, a urethane-based resin binder, a melamine-based resin binder, or the like, and may include any of them solely or in combination.

If the coating film is a heat blocking layer as described below, the resin binder may be preferably be a silicone-based resin binder. Since silicone resin binders are excellent in heat resistance property, the use of a silicone-based resin binder can ensure excellent heat blocking property in a heat blocking layer for use in environments in which the heat blocking layer is exposed to high temperatures, such as 300° C. or higher, for example.

[Other Components]

The coating film may contain one type of additive or a combination of plural types of additives such as a dye, a UV shielding material, a viscous material, a thickening material, a pigment dispersant, or a surface adjustment material. The additive is not particularly limited in terms of types, content, and the like, and may be a well-known additive as appropriate according to the usage of the coating film.

[Surface Roughness]

A surface roughness Ra of the coating film may be, for example, but not limited to, 8 or less, preferably 7.8 or less, more preferably 7 or less, or especially preferably 6 or less.

In particular, if the coating film is a heat blocking layer provided on a combustion chamber-facing portion of a component constituting a combustion chamber of an engine as described below, it is preferable that the surface roughness of the heat blocking layer be 6 or less. For combustion control in engines, it is important to let fuel travel to a combustion point as destinated, and therefore a sufficient surface smoothness of the heat blocking layer is required. The heat blocking layer with the surface roughness as described above would hinder prolongation of a traveling time of the fuel or slow combustion of the fuel, thereby making it possible to improve fuel consumption.

[Engine Components]

In the following, a heat blocking layer provided on a combustion chamber-facing portion of an engine component constituting a combustion chamber of an engine will be described as one example of the coating film, but it should be noted that the following description does not intend to limit the present disclosure to such an example.

FIG. 1 illustrates examples of engine components according to an embodiment described herein. In FIG. 1, reference numeral 1 indicates an aluminum alloy piston of an engine as a coating target, on which the heat blocking layer is formed, reference numeral 2 indicates a cylinder block, reference numeral 3 indicates a cylinder head, reference numeral 4 indicates an intake valve for opening and closing an intake port 5 of the cylinder head 3, reference numeral 6 indicates an exhaust valve for opening and closing an exhaust port 7, and reference numeral 8 indicates a fuel injection valve. The portions constituting the combustion chamber of the engine are a top surface of the piston 1, the cylinder block 2, the cylinder head 3, and front surfaces of umbrella portions of the intake and exhaust valves 4 and 6 (which are surfaces facing the combustion chamber), and the heat blocking layer 11 as described above is provided on these portions. The top surface of the piston 1 has a cavity 9. Note that a spark plug is not illustrated herein.

Figure 2:
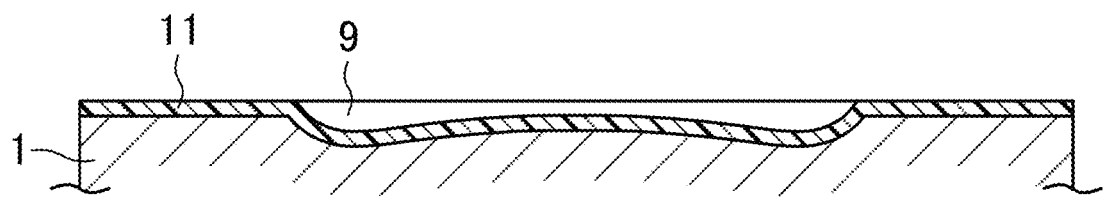
FIG. 2 is a cross-sectional view of a heat blocking layer on a top surface of a piston of the engine of FIG. 1.
Figure 3:
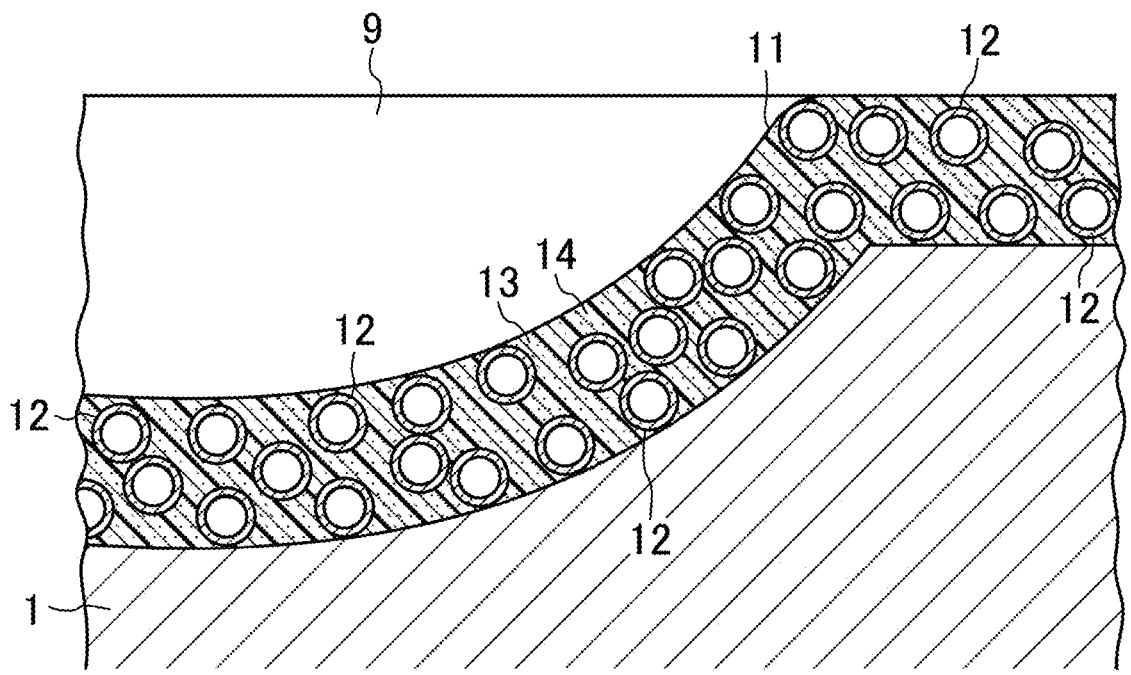
FIG. 3 is a partially enlarged cross-sectional view of the heat blocking layer of FIG. 2.

FIGS. 2 and 3 illustrate a heat blocking layer 11 provided on the top surface of the piston 1.

As illustrated in FIG. 3, the heat blocking layer 11 includes large numbers of hollow particles 12 and nanoparticles 14, and a resin binder 13. The resin binder 13 contains the hollow particles 12 and the nanoparticles 14 dispersedly (in FIG. 3, the nanoparticles 14 are represented as the dots). That is, the resin binder 13 holds the hollow particles 12 and the nanoparticles 14 to the piston 1, while filling the spaces between the particles, thereby forming a matrix of the heat blocking layer 11.

The thickness (hereinafter referred to as a "film thickness") of the heat blocking layer 11 may be, for example, 20 μm or more but not more than 150 μm, preferably 25 μm or more but not more than 125 μm, more preferably 25 μm or more but not more than 100 μm, further preferably 30 μm or more but not more than 100 μm, or especially preferably 40 μm or more but not more than 100 μm. The hollow particles 12 are of a μm-order particle diameter smaller than the film thickness of the heat blocking layer 11. Preferably, the hollow particles 12 have an average particle diameter of equal to or smaller than 30 μm, for example. For example, the hollow particles 12 may be preferably hollow particles with an average particle diameter of equal to or smaller than 10 μm.

It should be noted that the above-described numeric ranges are preferred ranges in the case where the heat blocking layer 11 is provided on the surface constituting the combustion chamber of the engine, and are not limitative. Moreover, in the case where the heat blocking layer 11 is provided on a device, a component, or a portion not constituting the combustion chamber, the particle diameter of the hollow particles 12 and the film thickness of the heat blocking layer 11 may be above or below these values described above.

The hollow particles 12 may be preferably inorganic hollow particles, such as ceramic-based hollow particles containing a Si-based oxide component (e.g., silica) or an Al-based oxide component (e.g., alumina), such as glass balloons, glass bubbles, fly ash balloons, silas balloons, silica balloons, or aluminosilicate balloons. A hollow rate of the hollow particle is preferably equal to or greater than 60 vol%, or more preferably equal to or greater than 70 vol%.

The content of the hollow particles 12 (which is the content of the hollow particles 12 in the heat blocking layer 11 after baking, and the same shall apply hereinafter) may be adjusted as appropriate for the heat blocking property or the like required in the heat blocking layer 11. The content of the hollow particles 12 may be, but not limited to, for example, 30 vol% or more but not more than 60 vol%, or preferably 40 vol% or more but not more than 55 vol%.

The average particle diameter of the hollow particles 12 can be adjusted according to the application or the like of the heat blocking layer 11, but may be, but not limited to, 1 μm or greater but not greater than 30 μm, or 1 μm or greater but not greater than 10 μm, from the viewpoint of ensuring excellent heat blocking property of the heat blocking layer 11.

The surface of the hollow particles 12 may be hydrophobized or hydrophilized. The hydrophobization or hydrophilization is not particularly limited, and may be carried out with a well-known method such as chemical modification treatment with an organic compound or surface modification treatment with fluorine plasma.

The nanoparticles 14 may be inorganic nanoparticles made of an inorganic compound such as zirconia, alumina, silica, or titania, or metal nanoparticles such as Ti, Zr, or Al. The nanoparticles 14 may be hollow or solid.

It is preferable that the nanoparticles 14 be inorganic nanoparticles. Especially, it is preferable that the nanoparticles 14 include at least one type selected from the group consisting of silica nanoparticles, alumina nanoparticles, and zirconia nanoparticles, and it is more preferable that the nanoparticles 14 include silica nanoparticles. It is considered that thermal degradation of the resin binder 13 is caused due to diffusion of oxygen radicals generated in the resin binder 13. To address this, the inorganic nanoparticles decrease a diffusion rate of the oxygen radicals to reduce the thermal degradation. Moreover, the inorganic nanoparticles reduce molecular motion of the resin binder 13 to reduce the thermal degradation thereof. The inorganic nanoparticles, especially silica nanoparticles, which are low in thermal conductivity, are advantageous for improving the heat blocking property of the heat blocking layer 11.

A percentage of the nanoparticles 14 (which is a percentage of the nanoparticles 14 in a total amount of the resin binder 13 and the nanoparticles 14 after baking, and the same shall apply hereinafter) may be preferably 10 vol% or more but not more than 55 vol%, or more preferably 20 vol% or more but not more than 55 vol%. Such an effect of reducing the thermal degradation becomes more noticeable in such a configuration that the percentage of the inorganic nanoparticles in the total amount of the resin binder 13 and the inorganic nanoparticles is equal to or more than the lower limits described above. A higher percentage of the nanoparticles 14 is more advantageous in improving the heat blocking layer 11 in strength by the rule of mixture. In addition, such a higher percentage of the nanoparticles 14 is accompanied with a relatively lower content of the resin binder 13, which is the cause of the thermal degradation of the heat blocking layer 11. Therefore, it is advantageous for improving the heat resistance of the heat blocking layer 11. With the reduction of the thermal degradation of the resin binder 13 due to such a higher percentage of the nanoparticles 14 and with the heat insulation effect of the hollow particles, it is possible to improve the heat blocking layer 11 in durability property while keeping the excellent heat blocking property thereof. However, an excessively high percentage of the nanoparticles 14 would deteriorate the heat blocking layer 11 in formability. Therefore, it is preferable that the percentage of the nanoparticles 14 be not more than the upper limits.

The average particle diameter of the nanoparticles 14 can be adjusted according to the application or the like of the heat blocking layer 11, but may be, but not limited to, for example, within a range of 1/1000 to 1/10 (inclusive) of the average particle diameter of the hollow particles 12, preferably within a range of 1/100 to 1/10 (inclusive) of the average particle diameter of the hollow particles 12. More specifically, the average particle diameter of the nanoparticles 14 may be, for example, 3 µm or smaller, preferably 500 nm or smaller, more preferably 1 nm or greater but not greater than 200 nm, or further preferably 1 nm or greater but not greater than 120 nm. The average particle diameter of the nanoparticles 14 within the ranges is advantageous in reducing the thermal degradation of the resin binder 13 in the heat blocking layer 11, thereby being advantageous in improving the heat blocking layer 11 in heat blocking property.

The surface of the nanoparticles 14 may be hydrophobized or hydrophilized, and it is preferable that the surface of the nanoparticles 14 be hydrophobized. The hydrophobization or hydrophilization is not particularly limited, and may be carried out with a well-known method such as chemical modification treatment with an organic compound or surface modification treatment with fluorine plasma. When the resin binder 13 is a silicone-based resin binder and the nanoparticles 14 are silica nanoparticles, it is preferable that the nanoparticles 14 be modified silica nanoparticles, whose surface is modified with a phenyl group. Such a configuration brings about a higher hydrophobicity of the silica nanoparticles, thereby providing the silica nanoparticles with a greater diffusivity within the silicone-based resin binder, which is more advantageous in hindering the thermal degradation of the heat blocking layer 11. Particularly, the phenyl group is compatible with the silicone-based resin, and therefore, the phenyl-group modification is advantageous for dispersing the silica nanoparticles. Moreover, since the phenyl group itself has a high heat resistance, the phenyl-group modification can reduce formation of defects (such as voids), which would become a starting point of cracking, in the silicone-based resin. This can effectively reduce the thermal degradation of the heat blocking layer 11.

The resin binder 13 is made of a 3-dimensional polymer with a high degree of branching, and may be, for example, a silicone-based resin binder, an epoxy-based resin binder, or the like, and it is preferable that the resin binder 13 be a silicone-based resin binder excellent in heat resistance, as described above. Specific examples of the silicone-based resin binder include organopolysiloxane and the like.

In the case where the heat blocking layer 11 includes the hollow particles 12, the nanoparticles 14, and the resin binder 13, the content of the resin binder 13 (which is the content of the resin binder 13 in the heat blocking layer 11 after baking, and the same shall apply hereinafter) is the rest of the heat blocking layer 11 other than the hollow particles 12 and the nanoparticles 14. The resin binder 13 may inevitably include, in addition, components such as residual components derived from components contained in raw materials of the resin binder 13 as described later, for example.

<Coating Film Forming Method>

In the following, a coating film forming method for forming a coating film on a surface of a coating target will be described.

Figure 4:
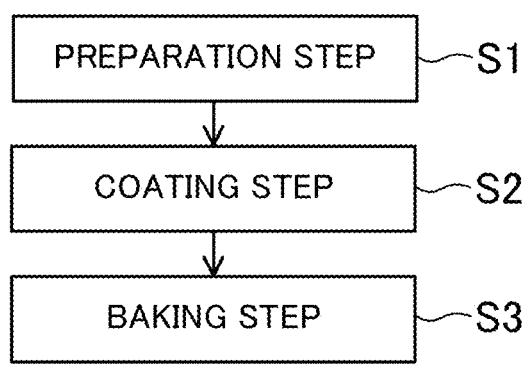
FIG. 4 is a flow diagram illustrating a procedure of a coating film forming method.

As illustrated in FIG. 4, the coating film forming method includes a preparation step S1 of preparing a coating composition for forming the coating film, a coating step S2 of applying the coating composition on a surface of a coating target, and a baking step S3 of obtaining a coating film by drying and baking the coating composition thus applied.

[Preparation Step]

The preparation step S1 includes mixing a raw resin for the resin binder, the particles, and a dilution solvent together, thereby obtaining the coating composition.

The mixing of the components is not particularly limited, and a well-known method such as stirring with a mixer or the like is employable for the mixing, for example. The stirring is not particularly limited in terms of stirring conditions such as a rotation rate and a stirring period, and may be carried out under well-known stirring conditions.

After subjected to post-treatment such as filtering, if necessary, the coating composition thus prepared is stored or subjected to the coating step S2. If necessary, a catalyst may be added to the paint composition just before the coating composition is subjected to the coating step S2. Details of the coating composition will be described later.

[Coating Step]

In the coating step S2, a surface of the coating target is coated with the coating composition thus prepared.

The applying of the coating composition is not particularly limited, and may be performed by a well-known method such as spray coating, or applying with a brush or a spatula.

[Baking Step]

As a result of applying the coating composition to the surface of the coating target, a film of the coating composition is formed. In the baking step S3, the coating target provided with the film of the coating composition (which may be referred to as "coated article" in this specification) thereon is dried and baked, thereby obtaining a coating film.

The drying and baking volatilize off the solvent from the film of the coating composition and cure the resin component, thereby forming the resin binder. In this way, such a coating film with the particles dispersed in the resin binder is obtained.

Conditions of the drying and baking are not particularly limited and may be well-known conditions as appropriate.

To give specific examples of drying and baking conditions, for example, if the coating film is the heat blocking layer described above, drying may be performed, for example, by leaving the coated article in the air for several minutes to several hours. Moreover, the baking may be performed in such a way that the coated article thus dried is heated, for example, at a temperature in a range of about 100° C. to about 200° C. for several minutes to several hours.

<Coating Composition>

The coating composition is used to form the coating film as described above, and if the coating film is the heat blocking layer described above, the coating composition is used as a coating for forming the heat blocking layer. Especially, in the case where the heat blocking layer is provided on the combustion chamber-facing portion of the component constituting the combustion chamber of an engine, the coating composition is a coating material for coating the combustion chamber-facing portion.

[Raw Resin of Resin Binder]

The raw resin for the resin binder is a resin component before curing, and is prepared or available as a raw resin solution, which, in general, contains said resin component, a crosslinking agent, fillers, an accelerator, and a solvent. The raw resin solution may be hydrophobic or hydrophilic.

In the case where the resin binder is the silicone-based resin binder, the raw resin solution may be, for example, a silicone-based reactive resin solution, more specifically. The silicone-based reactive resin solution as the raw resin solution includes a silicone-based reactive resin as the resin component. The silicone-based reactive resin solution may be of one-component addition curing type or dehydration condensation curing type, and may be preferably of one-component addition curing type.

[Dilution Solvent]

It is desirable that the dilution solvent be highly compatible with the raw resin solution. The dilution solvent may be a single-component solvent or a mixture solvent including a plurality of components. When the raw resin solution is hydrophobic, it is preferable that the dilution solvent also contains a hydrophobic component, and when the raw material resin solution is hydrophilic, it is preferable that the dilution solvent also contains a hydrophilic component.

Examples of the dilution solvent being hydrophobic include organic solvents. The organic solvent is not particularly limited, and may be a generally known organic solvent. More specifically, employable examples include: hydrocarbon solvents such as aliphatic solvents and aromatic solvents; ester solvents; ketone solvents such as acetone; and ether solvents. The organic solvent may be preferably an aromatic solvent. Specific examples of the aromatic solvent include toluene, xylene, 1,2,4-trimethylbenzene, thinners for dilution, and high-boiling-point aromatic solvents. It is preferable that the aromatic solvent includes at least one kind selected from the group consisting of toluene, xylene, and 1,2,4-trimethylbenzene. Especially in the case where the raw resin solution includes a silicone-based reactive resin, it is preferable that the solvent is toluene, which is highly dissolvable for the silicone-based reactive resin therein.

Examples of the dilution solvent being hydrophilic include alcohol-based solvents such as 2-ethylhexanol, butanol, ethanol, propanol, and ethylene glycol, and the dilution solvent being hydrophilic may be preferably at least one kind selected from the group consisting of 2-ethylhexanol, 1-butanol, and the 1-propanol.

In this specification, what is meant by the wording "solvent included in the coating composition" is a liquid content of the coating composition, the liquid content including the dilution solvent and a liquid component contained in the raw resin solution such as a solvent thereof. The liquid component contained in the raw resin solution is not particularly limited, but may be a component the same as the dilution solvent described above, for example.

The kind of dilution solvent employed is selected based on a later-described ratio V/D of a volatilization rate V to a diffusion coefficient D of the solvent included in the coating composition. The amount of the dilution solvent added is adjustable according to the ratio V/D, viscosity of the coating composition, or the like.

Since the raw resin solution contains the liquid content such as the solvent, if the ratio V/D and the viscosity of a mixture of the raw resin solution and the particles are sufficiently appropriate, the mixture as such may be employable as the coating composition without further adding the dilution solvent.

The viscosity of the coating composition is not particularly limited, and may be determined as appropriate according to the usage of the coating composition, or the other factors. More specifically, the viscosity may be, for example, in a range of $1.8 \times 10^{-3}$ Pa·s to $1 \times 10^{5}$ Pa·s inclusive, preferably in a range of $1 \times 10^{-2}$ Pa·s to $1 \times 10^{5}$ Pa·s inclusive, more preferably in a range of $1 \times 10^{-2}$ Pa·s to $5 \times 10^{4}$ Pa·s inclusive, or especially preferably in a range of $1 \times 10^{-2}$ Pa·s to $1 \times 10^{2}$ Pa·s inclusive.

The solid content (particles and the raw resin) in the coating composition may be, but not limited to, for example, 5 vol% or more but not more than 99.5 vol%, preferably 6 vol% or more but not more than 99 vol%, more preferably 9 vol% or more but not more than 95 vol%, further preferably 40 vol% or more but not more than 95 vol%, or especially preferably 41 vol% or more but not more than 95 vol%.

[Volatilization and Diffusion of Solvent during Baking Step]

The coating composition is so configured that the ratio V/D of the volatilization rate V (g/m²·s) of the solvent to the diffusion coefficient D ($10^{-9}$m²/s) of the solvent in the paint composition is 2.5 or less.

Figure 5:
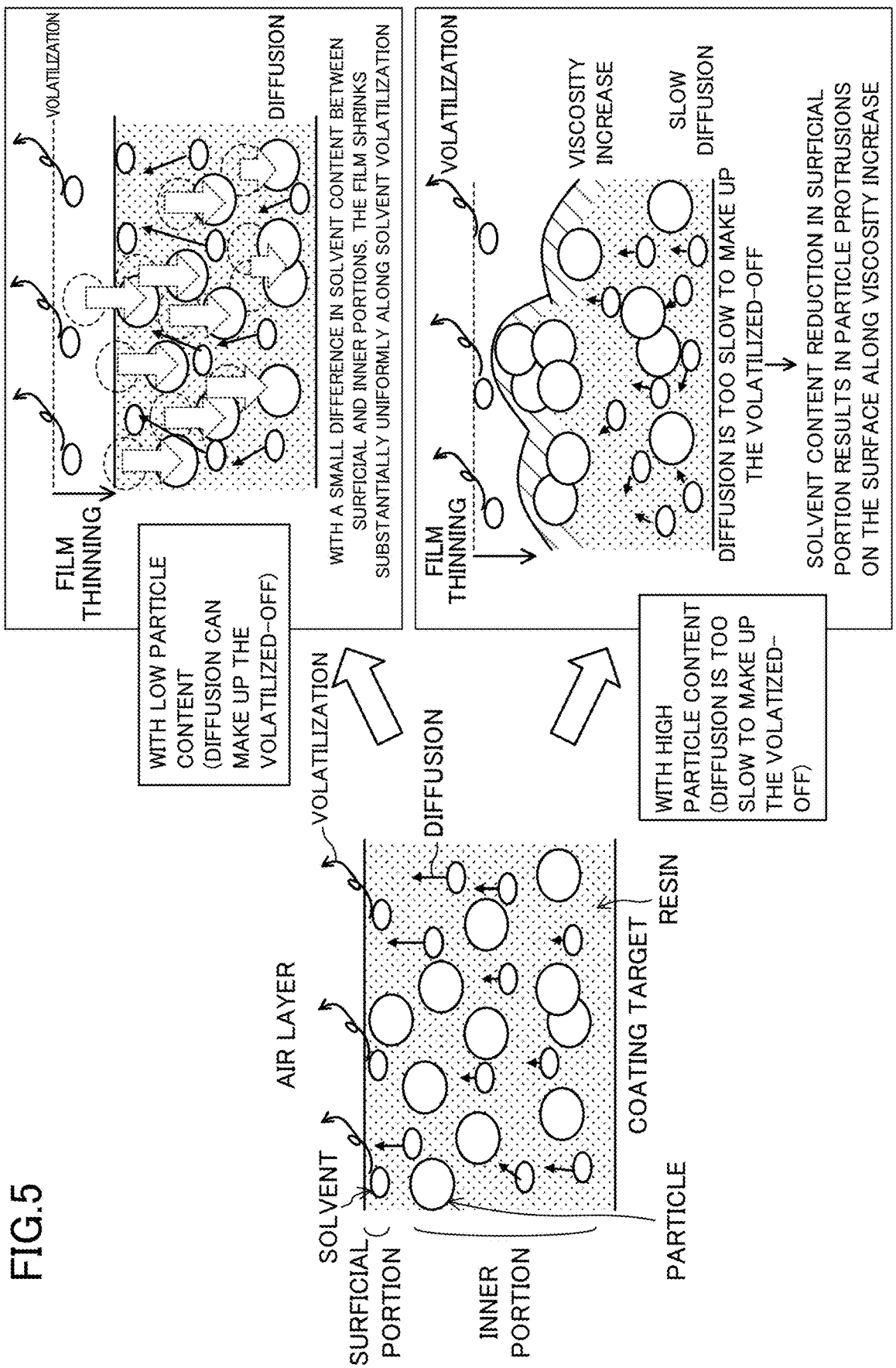
FIG. 5 is a view for explaining a relationship of a volatilization rate and a diffusion rate of a solvent during drying of a coating film with surface smoothness of the coating film.

FIG. 5 is a schematic view of shrinkage mechanism of the coating composition in the baking step S3. As illustrated in the left illustration in FIG. 5, the drying and baking of the coated article in the baking step S3 gradually volatilizes the solvent from the surface of the film of the coating composition. Along the volatilization of the solvent, the film of the coating composition shrinks, thereby eventually forming a coating film including the particles and the resin binder.

As illustrated in the upper right illustration in FIG. 5, for example, in the case of the formation of a coating film with a low particle content, the diffusion rate of the solvent in the inner portion of the film of the coating composition matches with the volatilization rate of the solvent volatilizing from the surficial portion of the film of the coating composition. As a result of this, the flowability of the particles is ensured and the difference in solvent concentration between the surficial and inner portions of the film of the coating composition is kept insignificant, thereby allowing the film of the coating composition to shrink relatively uniformly as a whole along the volatilization of the solvent. Therefore, in the case where the particle content is low, ensuring a sufficient surface smoothness in the coating film right after the film formation thereof is sufficient for substantially ensuring a sufficient surface smoothness in the coating film after the drying and baking thereof.

On the other hand, as illustrated in the lower right illustration in FIG. 5, in the case where the particle content is high, the presence of a large number of particles reduces the diffusion rate of the solvent within the inner portion of the film of the coating composition. This makes it difficult for the diffusion rate of the solvent to keep matching with the volatilization rate of the solvent, which reduces the flowability of the particles. This increases the difference in solvent concentration between the surficial and inner portions of the film of the coating composition. Accordingly, the flowability of the particles further decreases in the surficial portion of the coating composition as the viscosity increases along with the decrease in solvent content, and consequently, the particles would protrude from the surface of the coating film or cause undulation on the surface of the coating film, reflecting the geometry of the particles. As a result, in the case where the particle content is high, the surficial smoothness in the coating film after the drying and baking thereof becomes lower than right after the film formation, even though the surficial smoothness of the coating film is sufficiently ensured right after the film formation.

The coating composition according to the present embodiment is so configured that, in a system with a high particle content in the coating film, the ratio V/D of the volatilization rate V to the diffusion coefficient D is not beyond the predetermined value described above. This configuration can ensure a sufficient flowability of the particles during the drying and baking even in such a system with a high particle content. As a result of this, the difference in solvent concentration between the surficial and inner portions of the film of the coating composition is kept insignificant, so that the shrinkage of the film of the coating composition proceeds more uniformly along the volatilization of the solvent. This can ensure sufficient surface smoothness in the coating film after the drying and baking thereof.

The ratio V/D may be preferably 1.6 or less, more preferably 0.1 or more but not more than 1.6, or especially preferably 0.2 or more but not more than 1.5. These numerical ranges allow to effectively ensure a sufficient surface smoothness in the coating film after the drying and baking thereof.

The volatilization rate V of the solvent is not particularly limited, provided that the ratio V/D meets the numerical ranges. More specifically, the volatilization rate V may be, for example, 0.01 g/m$^2$·s or more but not more than 5 g/m$^2$·s, preferably 0.02 g/m$^2$·s or more but not more than 1 g/m$^2$·s, or more preferably 0.05 g/m$^2$·s or more but not more than 0.5 g/m$^2$·s.

Moreover, the diffusion coefficient D of the solvent is not particularly limited, provided that the ratio V/D meets any of the numerical ranges. More specifically, the diffusion coefficient D may be, for example, 0.1×10$^{-9}$ m$^2$/s or more but not more than 2×10$^{-9}$ m$^2$/s, or preferably 0.15×10$^{-9}$ m$^2$/s or more but not more than 0.5×10$^{-9}$ m$^2$/s.

<Experimental Examples>

In the followings, experimental examples, which were actually carried out, will be described.

<Experiment 1>

Figure 6:
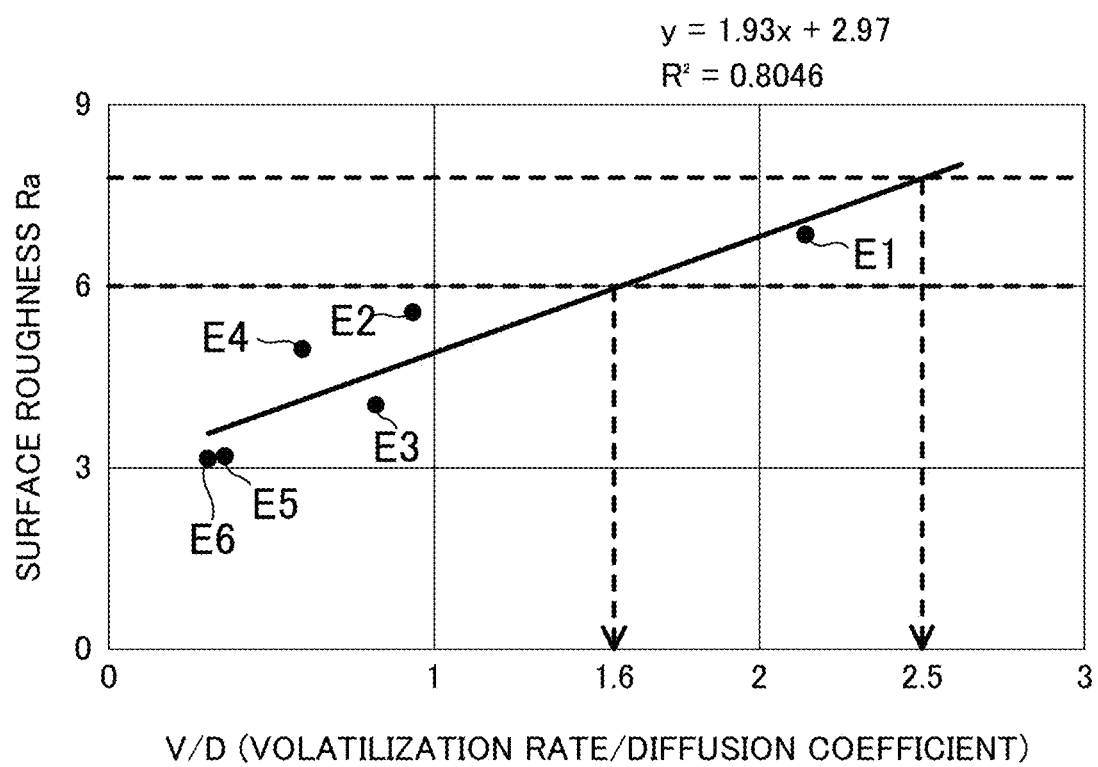
FIG. 6 is a graph illustrating relationships between a ratio V/D of a solvent in a coating composition and a surface roughness Ra of a coating film in experiment examples, where D is a diffusion coefficient and V is a volatilization rate of the solvent.
Figure 7:
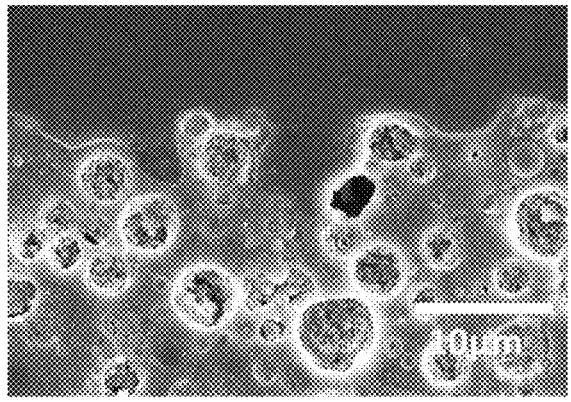
FIG. 7 shows cross-sectional SEM photographs of the coating films of the experimental examples.

Coating compositions of Experimental Examples 1 to 6 in which the coating compositions had the same solid content but different types of solvents in different amounts were compared in terms of the surface roughness Ra of (post-baking) coating films formed on a surface of coating targets from the respective coating compositions. Table 1 shows the amounts of the solvents used and results in the experimental examples. Moreover, FIG. 6 illustrates a graph on which the values of the surface roughness Ra are plotted against the V/D (volatilization rate/diffusion coefficient) in Table 1. Further, FIG. 7 shows cross-sectional SEM photographs of the coating films of Experimental Examples 1 and 6.

TABLE 1

| Experimental Examples | | 1 | 2 | 3 | 4 | 5 | 6 |
|---|---|---|---|---|---|---|---|
| Reference Characters | | E1 | E2 | E3 | E4 | E5 | E6 |
| Solid Content [vol %] | | 42 | 42 | 42 | 42 | 42 | 42 |
| Solvent Composition [vol %] | Toluene | 80 | 100 | 80 | — | — | — |
| | Xylene | — | — | — | 80 | 60 | 60 |
| | High-Boiling-Point Aromatic Solvent | — | — | — | — | — | 20 |
| | 2-Ethylhexanol | — | — | 20 | — | — | — |
| | 1-Butanol | — | — | — | 20 | 40 | 20 |
| | Acetone | 20 | — | — | — | — | — |
| Volatilization Rate V of Solvent [g/m$^2$·s]] | | 0.60 | 0.35 | 0.24 | 0.18 | 0.10 | 0.09 |
| Diffusion Rate D of Solvent [10$^{-9}$ m$^2$/s] | | 0.28 | 0.37 | 0.29 | 0.30 | 0.27 | 0.29 |
| V/D (Volatilization Rate/Diffusion Rate) | | 2.14 | 0.94 | 0.82 | 0.60 | 0.36 | 0.30 |
| Surface Roughness Ra | | 6.85 | 5.57 | 4.04 | 4.96 | 3.19 | 3.15 |

[Experimental Examples 1 to 6]

After a solvent with composition listed in Table 1 was added thereinto, an addition curing-type silicone-based resin solution containing a raw resin of a resin binder (organopolysiloxane) was manually stirred to prepare a precursor solution (preparation step).

Next, after hollow particles and nanoparticles were added into the precursor solution, the precursor solution was stirred by a planetary centrifugal mixer, thereby obtaining a coating composition (wet mixing step). The hollow particles employed herein were fine balloons of aluminosilicate with an average particle diameter of 5 μm, and the nanoparticles employed herein were phenyl group-modified silica nanoparticles with an average particle diameter of 100 nm. Moreover, rotational frequencies of the planetary centrifugal mixer were 2000 rpm for planetary rotation and 1000 rpm for centrifugal rotation, and stirring time was 5 min.

As shown in Table 1, the solid contents (the hollow particles, the nanoparticles, and the raw resin of the resin binder) in the coating composition thus obtained were 42 vol% in all of Experimental Examples 1 to 6.

After a catalyst was added to the coating composition thus obtained, the coating composition was air-sprayed onto a flat plate to form a film with the same film thickness (coating step), and baked in an oven at an arbitrary temperature to obtain a coating film (baking step).

In each of Experimental Examples 1 to 6, the coating film after the baking contained the hollow particles by 50 vol%, the nanoparticles by 20 vol%, and the resin binder by 30 vol%.

[Solvent Volatilization Rate]

Each of the coating compositions of Experimental Examples 1 to 6 was sprayed onto a flat plate using a coating machine, and the weight of the flat plate was measured after 10 and 30 seconds from the end of spraying. An amount of volatilization per unit time [g/s] was calculated out based on the following equation (1):

Amount of Volatilization Per Unit Time [g/s]=[Mass of Flat Plate after 30 seconds−Mass of Flat Plate after 10 seconds]/20 seconds    (1).

Furthermore, a coating area of the coating composition after atmospheric drying was calculated out, and the volatilization rate of the solvent contained in the coating composition [g/(m$^2$·s)] was calculated out based on the following equation (2):

Solvent Volatilization Rate [g/(m$^2$·s)]=Amount of Volatilization Per Unit Time/Coating Area (2).

[Diffusion Coefficient of Solvent]

The diffusion coefficient D [10$^{-9}$m$^2$/s] of the solvent contained in the coating composition of each of Experimental Examples 1 to 6 was measured using a pulsed field gradient NMR technique.

[Surface Roughness]

According to JISB0633, a surface roughness Ra of the coating film of each of Experimental Examples 1 to 6 was measured by using a tactile surface roughness measuring device.

[Cross-Sectional SEM Photographs]

Cross-sectional SEM photographs of the coating films of Experimental Examples 1 and 6 were taken by using a scanning electron microscope.

[Discussion]

As illustrated in FIG. 6, it was found that there is a proportional correlation between the V/D and the surface roughness Ra of the coating film in Experimental Examples 1 to 6.

Considering that the surface roughness Ra is preferably about 8 or less, it can be understood from FIG. 6 that the V/D may be preferably about 2.5 or less.

Moreover, in the case where the coating film thus obtained is provided on a surface of a combustion chamber-constituting portion of an engine component, it is preferable that the surface roughness of the heat blocking layer be 6 or less, for hindering prolongation of the traveling time of the fuel or slow combustion of the fuel, thereby to improve fuel consumption. Therefore, FIG. 6 demonstrates that the V/D is preferably 1.6 or less.

As can be understood from FIG. 7, the surface smoothness of the coating film in Experimental Example 6 is actually improved compared to the coating film in Experimental Example 1. In particular, it is deduced that, in the coating film of Experimental Example 1, the presence of the particle protrusions on the surface would deteriorate the surface smoothness. On the other hand, it is deduced that, in the coating film of Experimental Example 6, the absence of particle protrusions on the surface of the coating film improves the surface smoothness.

<Experiment 2>

This experiment evaluated how the particle content of hollow particles and nanoparticles in the coating film affects the surface smoothness of the coating film after the baking. Results are shown in FIG. 8.

Figure 8:
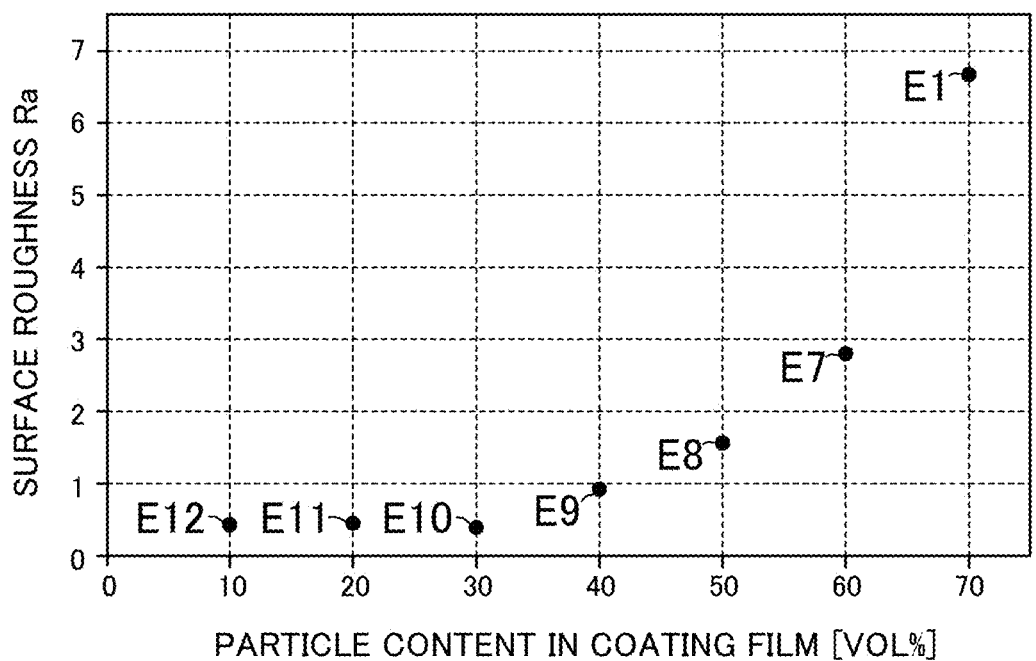
FIG. 8 is a graph illustrating a relationship between a particle content and a surface roughness Ra in the coating film of experimental example.

The reference character E1 in FIG. 8 indicates Experimental Example 1 described above. Likewise, the reference characters E7 to E12 indicate Experimental Examples 7 to 12, respectively. As illustrated in FIG. 8, the particle contents (the hollow particles and the nanoparticles) in the coating films in Experimental Examples 1, 7 to 12 were 70 vol%, 60 vol%, 50 vol%, 40 vol%, 30 vol%, 20 vol%, and 10 vol%, respectively. The ratio (volume ratio) of the hollow particles to the nanoparticles in the particle content is hollow particles : nanoparticles=5:2 in all Experimental Examples 1 and 7 to 12.

The coating compositions and coating films in Experimental Examples 7 to 12 were prepared and formed under the same conditions as in Experimental Example 1, except that the particle contents including the hollow particles and nanoparticles in the coating films were varied. The surface roughness Ra therein was also measured in the same way as in Experimental Example 1.

As can be understood from FIG. 8, a particle content in the coating film more than 30 vol% gives the coating film a larger surface roughness Ra. That is, the technique of the present disclosure is preferably applicable to cases where the particle content in the coating film is more than 30 vol%.

The present disclosure can provide a coating composition, a coating film forming method using the coating composition, and an engine component with the coating film, which can ensure sufficient surface smoothness after drying and baking, even if the coating film has a high particle content, and therefore, the present disclosure is highly useful.

What is claimed is:

1. A coating composition for forming a coating film including particles and a resin binder, wherein
   a content of the particles in the coating film is more than 30 vol%,
   the coating composition comprises the particles, a raw resin of the resin binder, and a solvent, and
   a ratio V/D is 2.5 or less, where V is a volatilization rate (g/m$^2$·s) of the solvent, and D is a diffusion coefficient (10$^{-9}$ m$^2$/s) of the solvent in the coating composition.

2. The coating composition of claim 1, wherein the ratio V/D is 1.6 or less.

3. The coating composition of claim 1, wherein the solvent includes a hydrocarbon solvent and/or an alcohol-based solvent.

4. The coating composition of claim 3, wherein the hydrocarbon solvent is an aromatic solvent.

5. The coating composition of claim 4, wherein
   the aromatic solvent includes at least one selected from the group consisting of toluene, xylene, and 1,2,4-trimethylbenzene, and
   the alcohol-based solvent includes at least one selected from the group consisting of 2-ethylhexanol, 1-butanol, and 1-propanol.

6. The coating composition of claim 1, wherein the particles include at least either hollow particles or nanoparticles.

7. The coating composition of claim 1, wherein the resin binder is a silicone-based resin binder.

8. The coating composition of claim 1, wherein the coating composition is a coating material for forming a heat blocking layer.

9. The coating composition of claim 8, wherein the coating composition is a coating material for coating a combustion chamber-facing portion of a component of an engine, the component constituting a combustion chamber of an engine.

10. A method of forming a coating film on a surface of a coating target with a coating composition, wherein
    the coating composition is the coating composition of claim 1,
    the method comprising:

applying the coating composition on the surface of the coating target; and baking the coating composition thus applied, so as to obtain the coating film, wherein the applying includes applying the coating composition in such a way that the coating film will be 25 μm or more but not more than 100 μm in thickness after the baking.

11. The method of claim 10, wherein the coating target is an engine component having a portion constituting a combustion chamber, and the surface is a surface of the portion.

12. An engine component, comprising:

a portion constituting a combustion chamber; and a coating film provided on a surface of the portion and formed from the coating composition of claim 1.

13. The engine component of claim 12, wherein the coating film is a heat blocking layer.

14. The engine component of claim 12, wherein the coating film includes large numbers of hollow particles and nanoparticles, and a resin binder.

15. The engine component of claim 12, wherein the resin binder is a silicone-based resin binder.

16. The engine component of claim 12, wherein the coating film is 25 μm or more but not more than 100 μm in thickness.

17. The engine component of claim 12, being at least one of a piston, a cylinder head, or a cylinder block.

18. The coating composition of claim 5, wherein the particles include at least either hollow particles or nanoparticles.

19. The coating composition of claim 18, wherein the resin binder is a silicone-based resin binder.

20. The engine component of claim 14, wherein the resin binder is a silicone-based resin binder, and the coating film is 25 μm or more but not more than 100 μm in thickness.

* * * * *